Aug. 19, 1958 H. M. ZEIDLER 2,848,606
ELECTRONIC PROTECTIVE DEVICE
Filed March 11, 1954
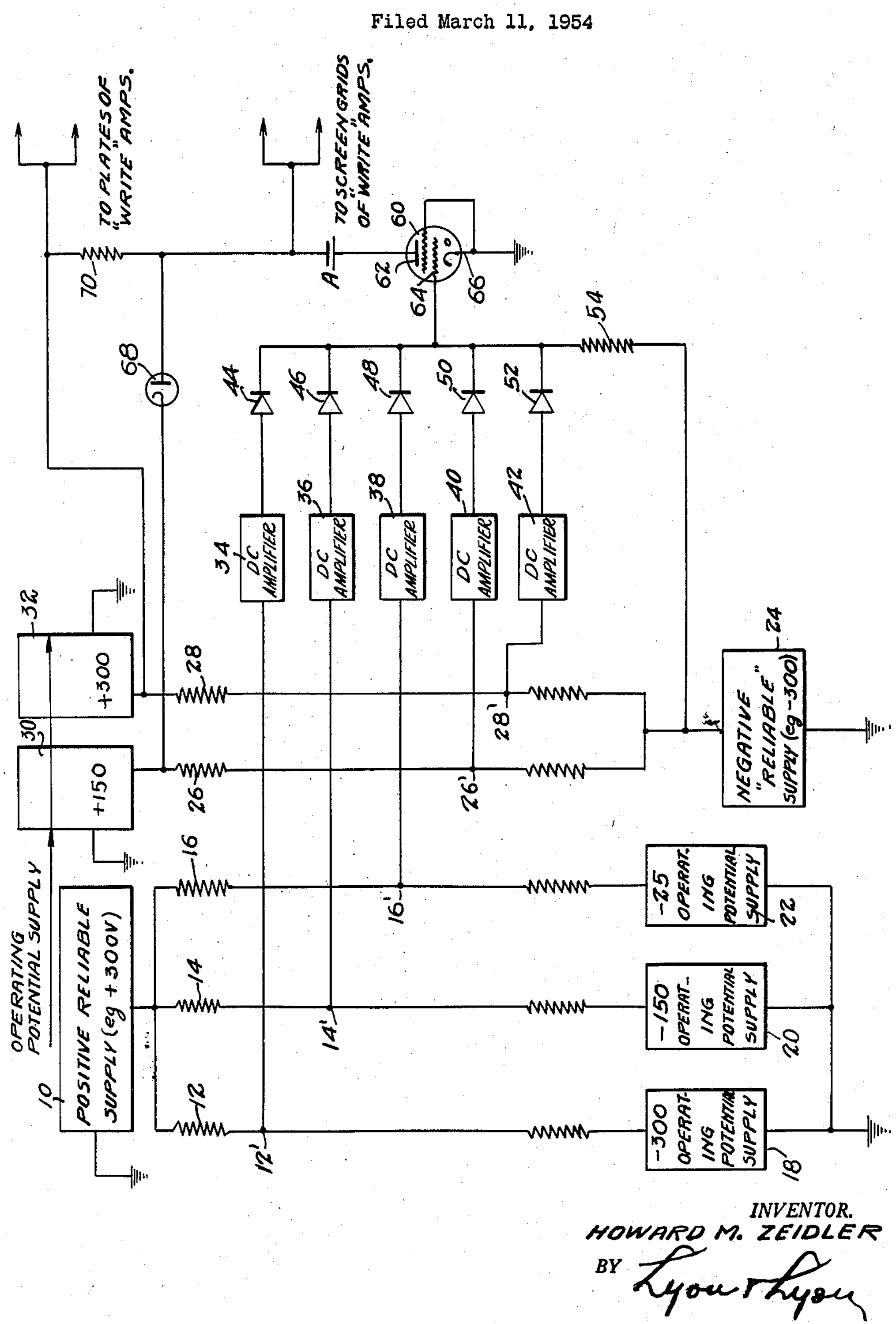
INVENTOR.
HOWARD M. ZEIDLER
BY Lyon & Lyon
ATTORNEYS United States Patent Office 2,848,606

Patented Aug. 19, 1958

2,848,606

ELECTRONIC PROTECTIVE DEVICE

Howard M. Zeidler, Palo Alto, Calif., assignor, by mesne assignments, to General Electric Company, New York, N. Y., a corporation of New York Application March 11, 1954, Serial No. 415,658

8 Claims. (Cl. 250—27)

This invention is for a protective system of the type employed in an electronic apparatus where any spurious voltage variations from the power supply of the apparatus must be avoided.

Electronic systems are employed for tape recording and recording on drums having peripheries coated with magnetic material. These types of recording systems are presently finding extensive use in computers and information handling machines. It is well known that one of the prime requirements for computers and information handling machines is that they be accurate in their processing of the information which is supplied to them. Of course, the accuracy of the results obtained from these machines can only be as great as the information supplied to them. The input devices usually consist of either magnetic tapes or, in some instances, drums. Furthermore, in processing the information, some form of storage is usually employed, and this, too, consists at present of tape and drum recording equipment.

In order to apply or write information on the magnetic tapes or drums, recording heads are employed which are driven from electronic amplifiers. These amplifier tubes are usually supplied with operating potentials, negative for biasing purposes and positive for anodes and screen grids, from one or more power supplies, which may be termed the operating potential power supplies. Of course, these tubes are usually driven by others which, likewise, secure their operating potentials from the operating potential sources. The information on the magnetic tape or drum is usually of the binary coded type, wherein positive and negative pulses or pulses and no pulses are applied to represent One or Zero. It will be appreciated that if there are any spurious voltage changes or fluctuations in the operating potential sources, these either can appear to replace the information on the tape or drum passing under the writing head at the time of the occurrence of the voltage variation, or the information can be erased thereby.

In the case of a sudden loss or a fluctuation of the negative supply voltage applied at the grids of the tubes in the tape recording circuit to bias them off in the absence of writing information, spurious impulses can be written over the previously recorded desired data. In the case of loss or serious alteration of positive supply voltages which are critical, such as those supplying screen and plate grids to the "write" amplifiers, it is possible that unsatisfactory recording of the desired data can occur during the transient period. The problem of correction or protection against power supply voltage variation is a serious one, because damage may be done in periods of the order of one microsecond, if suitable precautions are not taken.

Accordingly, it is an object of the present invention to provide a protective system for electronic recording circuits.

It is a further object of the present invention to provide a protective system for electronic recording circuits which prevents spurious recordings caused by variations in the operating potential power supplies.

Still another object of the present invention is to provide a new and novel protective system for electronic recording circuits.

Yet another object of the present invention is to provide a protective system for electronic recording circuits which is operative to prevent spurious recording due to voltage variations on the order of microseconds in the power supply.

These and other objects of the present invention are provided by a system wherein there are employed sources of reliable positive and negative potentials. The positive operating potential source of the tape recording system in each instance is connected through a separate first voltage divider to the opposite reliable negative potential source. The negative operating potential source is connected in each instance through a separate voltage divider to a positive reliable voltage source. Desired monitoring points on each of these voltage dividers are coupled to an Or gate which, in turn, is connected to the grid of a gas discharge tube. The tube is biased to be nonconducting, except if there is a change in potential of one of the monitoring potential points. The anode of the tube is coupled to the screen grids of the amplifiers in the recording circuits which it is desired to protect. A clamping diode is connected from the anode of the gas tube to the screen grid source of operating potential. An anode load resistor has one end connected to the gas tube anode and the other end connected to a suitable positive operating potential supply. Variation in potential at any one or more of the points being monitored fires the gas tube and thus removes operating potential from the recording tubes, thus preventing false recordings.

The novel features that are considered characteristic of this invention are set forth with particularity in the appended claims. The invention, itself, both as to its organization and method of operation, as well as additional objects and advantages thereof, will best be understood from the following description when read in connection with the accompanying drawing which is representative of a circuit diagram of an embodiment of the invention.

Since power supplies and the electronic circuits for recording information on magnetic tapes and drums are well known and found adequately described in the literature, these systems will not be shown here, as they would serve to needlessly lengthen and complicate this description. The proper connections of the embodiment of this invention to these circuits, however, is described and shown herein.

In recording systems of the general type intended, usually three negative potential sources are provided: the first is the Zero reference voltage, to which base all voltatge pulses are referred; the second is usually a voltage of about −150 volts, to which gates and flip-flop grid circuits are returned; and the third source of negative voltage is usually on the order of −300 volts, and grid circuits at cathode followers used in the recording system are usually connected thereto.

The positive supply voltages are usually on the order of +300 volts for anode circuits and +150 volts for screen grid circuits. A positive reliable source of supply 10 on the order of +300 volts is provided. By means of voltage dividers 12, 14, 16, this positive reliable supply 10 is connected to the various negative opertaing potential sources 18, 20, 22 which it is desired to monitor. Likewise, a reliable negative source of supply 24 is connected through separate voltage dividers 26, 28 to the anode and screen grid operating voltage sources 30, 32 which it is desired to monitor. The voltage supplies 10, 24, which are designated as reliable, are preferably separate supplies with adequate provision taken to guarantee their being maintained consistently over long periods of time. They should also have characteristics such that, in the event of power failure, the levels would be maintained for a period of time sufficient to block operation of the recording circuits involved. Such "long-time constant" supplies are known and merely require the use of large value capacitors in their outputs.

Desired monitoring potential points 12′, 14′, 16′, 26′, 28′ are selected on each of the voltage dividers. These points on the voltage dividers 12, 14, 16 between the positive reliable supply 10 and the negative operating voltage supplies 18, 20, 22 are connected to separate direct-coupled amplifiers 34, 36, 38. The outputs of these amplifiers are applied to the anodes of separate diodes 44, 46, 48. In the case of the voltage dividers 26, 28, between the positive operating potential sources 30, 32 and the negative reliable supply 24 desired monitoring voltage points 26′, 28′ are applied through inverter direct-coupled amplifiers 40, 42 to separate diodes 50, 52. These inverter amplifiers may be amplifiers with the number of stages required to invert the phase of the signal. The diodes are all connected together at their outputs to form an Or gate circuit and are then connected to the control grid 64 of a gas-discharge tube 60. This tube 60 is preferably of the type designated as a thyratron. The control grid of the tube 60 is biased from the reliable negative potential source 24 through a resistor 54 so that the tube is normally non-conducting and will conduct only upon the reception of a signal through the Or gate. The anode 62 of the gas tube is connected to the screen grids of the tubes in the recording system whose operating voltages should be maintained such as those of the various Write amplifiers. A clamping diode 68 is also connected between the source of operating potential for the screen grid 30 and the gas tube anode 62. An anode load resistor 70 has one end connected to the gas tube anode 62 and the other end connected (1) to the anode operating potential source 32 and (2) to the anodes of the Write amplifiers or to their plate transformers (not shown). This resistor carries the various screen currents and should be selected to have sufficient dissipation wattage.

The voltages occurring at the monitoring points 12, 14′, 16′, 26′, 28′ of the various voltage dividers do not have to be passed through the amplifiers and amplifier inverters. The phase and sensitivity requirements of the system determine whether or not they are required. Naturally, the higher the desired monitoring sensitivity, the higher the gain that is required from the amplifiers. The bias of the gas tube is usually set at a potential slightly more negative than the ionization potential. If one or more of the potentials being monitored on the voltage dividers changes a certain predetermined critical value, these voltage changes are applied through the associated amplifiers or inverter amplifiers through the Or gate in a positive direction to the grid of the gas tube. This causes the gas tube to be ionized, and, as a result, its plate potential is reduced to a very low voltage. Since the screen grids of the Write amplifiers are connected directly to the gas tube plate 62, the Write amplifiers are rendered inoperative by the screen grid voltage reduction. Injections of erroneous or unsatisfactory data into the recording medium is thereby prevented. It should be noted that the fluctuations being monitored, which fire the gas tube, are the positive ones in the case of the negative operating potentials and the negative ones in the case of the positive operating potentials. As pointed out previously, these are the significant fluctuations, since loss of bias can cause false writing and loss of anode or screen potential can cause either false writing or loss of information or possibly both. Protection against any fluctuation can be readily achieved with the teachings shown herein, but are not believed necessary.

It is to be noted that additional protection for the recording circuit is afforded by the clamping diode 68. In a conventional system, failure of the anode operating potential supply causes excessive screen current to flow in the Write amplifier tubes. Here, however, since the screen current is supplied through the gas tube anode load resistor 70 and since the screen voltage is clamped at an appropriate valve by the clamping diode 68, operation of the Write amplifiers is normally identical with that obtained in a conventional amplifier where the screen is connected directly to its associated supply voltage. However, with the present invention, if the plate supply (+300 volts) is lost, the screen potential which is derived via the anode load resistor 70 cannot be maintained at the normal operating voltage potential. Under these conditions, the diode is placed under reverse conduction conditions. Since the backward resistance of a diode is extremely high, only a very small current is available, and, consequently, the screen potential drops to such a low value that the screen grid dissipation is limited to a safe magnitude. The Write amplifier tubes are protected and spurious recording is avoided.

In the event that the gas tube becomes conductive, usually a voltage as great as 10 or 15 volts can occur across the cathode-anode load circuit of the tube. If the writing characteristics of the recording system are such that the small currents developed by this small voltage cannot be tolerated, a small battery may be inserted in series with the thyratron plate lead at point "A" with such a polarity that the screen grids of the Write tubes are negative when the system is de-activated. Under these conditions, the small Write current can be completely cut off.

While the system is shown as monitoring separate sources of potential, it will be appreciated that these all may be a single source of potential with different potential points therein being monitored or a plurality of separate sources.

Accordingly, there has been described and shown herein a protective system for preventing spurious voltage variations from being recorded. The circuit is novel and useful, and its operating time is on the order of the microseconds required for a gas tube to become ionized.

I claim:

1. A protective system for a system including electronic amplifiers supplied with operating potentials from a positive and negative potential source, said protective system comprising a reliable positive potential source, a reliable negative potential source, a gas discharge tube having an anode, control grid and cathode, means coupling said positive operating potential source with said reliable negative potential source and said reliable positive potential source with said negative operating potential source, means coupling the control grid of said gas tube to desired potential points in said means coupling said operating potential sources, means to bias said gas tube to be conductive only upon changes in the potential of said desired potential points, and means coupling said gas tube anode to the output electrodes of said electronic amplifiers whereupon conduction of said gas tube inactivates said electronic amplifiers from recording.

2. A protective system as recited in claim 1 wherein said means coupling said positive operating potential source with said reliable negative potential source and said negative operating potential source with said reliable positive potential source includes two voltage dividers, and said means coupling the control grid of said gas tube to said voltage dividers includes an Or gate having its output coupled to said control grid and each of its plurality of inputs coupled to desired monitoring potential points on said voltage dividers.

3. A protective system for a system including electronic amplifiers supplied with operating potentials from positive and negative operating potential sources, said protective system comprising a reliable positive potential source, a reliable negative potential source, a gas-discharge tube having an anode, control grid and cathode, an anode load resistor coupled to said anode, a first voltage divider coupled between said positive operating potential source and said reliable negative potential source, a second voltage divider coupled between said negative operating potential source and said reliable positive potential source, an Or gate having a plurality of inputs and an output, means coupling said Or gate inputs to desired voltage monitoring points on said first and second voltage dividers, said Or gate output being coupled to the control grid of said gas tube, means to bias said gas tube to be conductive only upon changes of potential of said monitoring points, and means coupling said plate load resistor to certain electrodes of said electronic amplifiers whereupon conduction of said gas tube inactivates said electronic amplifiers.

4. A protective system as recited in claim 3 wherein said means coupling said Or gate inputs to desired voltage monitoring points on said first and second voltage dividers includes an amplifier coupled between an Or gate input and said second voltage divider, and an inverter amplifier coupled between another Or gate input and said first voltage divider.

5. A protective system as recited in claim 3 wherein said certain electrodes of said electronic amplifiers include anode and screen grid electrodes and said screen electrodes are coupled to the anode of said gas tube and said anode electrodes are coupled to the end of said anode load resistor which is not coupled to said gas tube anode.

6. A protective system for a recording system including electronic amplifiers having anode and screen grid electrodes and having operating potentials supplied from positive and negative operating potential sources, said protective system comprising a reliable positive potential source, a reliable negative potential source, a gas discharge tube having an anode, control grid and cathode, an anode load resistor having one end connected to said anode, a first voltage divider coupled between said positive operating potential source and said reliable negative potential source, a second voltage divider coupled between said negative operating potential source and said reliable positive potential source, a plurality of diodes, means coupling one electrode of each of said diodes to desired voltage monitoring points on each of said voltage dividers, means coupling the other electrode of all said diodes to said control grid of said gas tube, means to bias said gas tube to be operative only upon changes of potential of said monitoring points, means coupling said positive operating potential source to the other end of said anode load resistor and the anodes of said electronic amplifiers, means coupling the screen grid of said electronic amplifiers to the anode of said gas tube and a clamping diode connected between said source of operating potential and said gas tube anode.

7. A system as recited in claim 6 wherein there are a plurality of positive and negative operating voltage sources, a reliable negative and a reliable positive voltage source respectively connected thereto by a plurality of first and second voltage dividers and there are a plurality of diodes each of which couples a desired monitoring voltage point on a different one of said voltage dividers to the control grid of said gas tube.

8. A protection system for a recording system of the type having electronic tube amplifiers with anode and screen grid electrodes and having operating potentials supplied from positive and negative operating potential sources, said protective system comprising a reliable positive potential source, a reliable negative potential source, a plurality of first voltage dividers each of which is connected between a different one of said positive operating potential sources and said negative reliable potential source, a plurality of second voltage dividers each of which is connected between a different one of said negative operating potential sources and said positive reliable potential source, a gas tube having an anode, cathode and control grid, a plurality of diodes each having one of their electrodes coupled to said control grid, a plurality of amplifiers having inputs and outputs, said amplifier outputs being coupled to the other electrodes of said diodes, a plurality of inverter amplifiers each of which is coupled between desired monitoring potential points on respective ones of said first potential dividers and different ones of said amplifier inputs, the inputs of the remaining ones of said amplifiers being coupled to desired monitoring potential points of said second voltage dividers, means to bias said gas tube from one of said reliable negative potential sources to be non-conducting except upon changes of potential of said monitoring points, a clamping diode connected between one of said sources of operating potential and said gas tube anode, means coupling the screen grid electrodes of said electronic tube amplifiers and said gas tube anode, and an anode load resistor having one end coupled to said gas tube anode and the other end coupled to one of said sources of positive operating potential and the anode electrodes of said electronic amplifiers.

References Cited in the file of this patent

UNITED STATES PATENTS

| | | |
|---|---|---|
| 2,129,088 | George | Sept. 6, 1938 |
| 2,571,027 | Garner | Oct. 9, 1951 |
| 2,575,232 | Parker et al. | Nov. 13, 1951 |
| 2,615,147 | Hoover | Oct. 21, 1952 |
| 2,674,727 | Spielberg | Apr. 6, 1954 |
| 2,679,617 | Mullaney et al. | May 25, 1954 |